March 10, 1942.  C. A. LANG  2,276,212

GAUGING APPARATUS

Original Filed April 25, 1938

CHARLES A. LANG
INVENTOR

BY Paul, Paul & Moore
ATTORNEYS

Patented Mar. 10, 1942

2,276,212

UNITED STATES PATENT OFFICE 2,276,212

GAUGING APPARATUS

Charles A. Lang, Minneapolis, Minn., assignor to Langage, Inc., Minneapolis, Minn., a corporation of Minnesota Original application April 25, 1938, Serial No. 204,073. Divided and this application August 23, 1940, Serial No. 353,877

8 Claims. (Cl. 116—118)

This invention relates to gauging apparatus, and more particularly to liquid level gauges of the mechanically operated type for the accurate gauging of liquid levels in tanks.

Frequently the tanks for bulk storage of gasoline, oil, and other liquids are placed underground under driveways and the like. It has heretofore not been feasible to provide a gauging apparatus adjacent the tank or tanks thus located, and accordingly the gauging of such tanks has been by means of hand lines, gauging sticks and other tallying devices. These however, have been inconvenient to use and have not provided a sufficiently accurate measurement of the liquids in the tank to be acceptable under all conditions.

It is accordingly an object of the invention to provide a gauging apparatus for indicating the liquid level in liquid containing tanks, and more particularly, to provide an apparatus capable of being installed in driveways, roadways, and the like, directly above the tanks.

It is likewise an object of the invention to provide a gauging apparatus which is water and dirt proof, easily installed and easily serviced, and one which is rugged, economical to manufacture, simple in its construction, and accurate in its operation.

It is a further and more specific object of the invention to provide a gauging apparatus in which the gauging mechanism per se is mounted for movement to an exposed position such that installation, repair and adjustment are facilitated.

Other objects of the invention are those inherent in and implied by the invention herein illustrated, described and claimed.

The invention is illustrated with reference to the drawing in which

Throughout the drawing, corresponding numerals designate corresponding parts.

Figure 1:
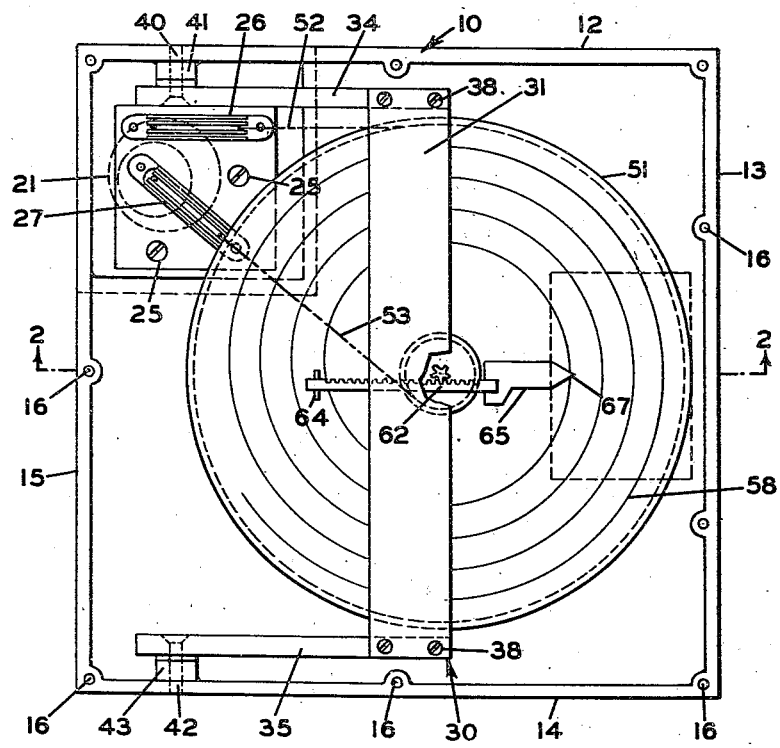
Figure 1 is a plan view of the gauging apparatus of the present invention showing the top cover of the case removed, and certain of the parts thereof broken away.

The gauging apparatus comprises a casing, generally designated 10, of rectangular, preferably square, configuration and preferably having a flat bottom 11 and side walls 12, 13, 14 and 15. The casing is provided with a cover 18, which is attached by means of a plurality of screws 19, which are threaded into screw holes 16 in the side walls. At one corner of the housing, the bottom 11 is recessed as shown at 20 and is provided with a pipe coupling portion 21, which receives a conduit pipe 22 extending upwardly directly from the tank. Within the recess 20, there is mounted a bed plate 23 of square configuration, which is attached in the recess by means of a plurality of screws 25. The bed plate substantially covers pipe coupling opening 21.

Upon the bed plate 23, there are mounted a plurality of pulleys 26 and 27 for a purpose to be described.

Within the housing, there is mounted a swing frame, generally designated 30, comprising a top piece 31 and a bottom piece 32, which are attached to pivot bars 34 and 35 by means of screws 38. The bar 34 is pivotally connected to the casing wall 12 by means of a screw 40, which extends through the bar 34 and into the boss 41. Similarly, the bar 35 is pivotally connected to the casing wall 14 by means of a screw 42 which passes through bar 35 into the boss 43 of the casing wall. The screws 40 and 42 extend along the same axis and therefore the entire frame 30 may be swung from the position shown in Figure 2 to a position in which the frame extends upwardly from the casing 10. It will be noted further that the pivoting axis defined by screws 40 and 42 is closely adjacent the axis of pipe conduit 22.

A resistant shaft 50 is journaled in the cross bars 31 and 32 and carries a winding drum 51 upon which one of the operating wires 52 is adapted to be wound, and a smaller winding drum 54 upon which a counter-weight supporting wire 53 is adapted to be wound. The wire 52 extends from the winding drum 51 over the pulley 26 and thence downwardly closely adjacent the inside of the conduit pipe 22 into the tank. The counter-weight supporting wire extends from the counter-weight winding drum 54 over the counter-weight wire pulley 27 and thence downwardly to a counter-weight 55, which operates through a vertical path of movement in the conduit pipe 22.

Upon one face of the winding drum 51, or upon an indicia disc attached thereto, there is inscribed a spiral 58 of indicia which, as illustrated, extends through a plurality of turns. Upon the shaft 50, and adjacent the indicia side of the drum, there is a pinion 60 of small diameter which meshes with a rack bar 62, the rack bar operating in a transverse groove on the underside of the frame piece 31. At one end of the rack bar, there is provided a pin 64 and at the other end an indicia pointer 65 which serve to limit the movement of the rack bar 62 transversely with respect to the frame piece 31. Accordingly, as the shaft 50, and drum 51 rotate, the rack bar is moved along a radial path of movement from a position close to the center of the dial to a position close to the edge of the dial, the tip 67 of the pointer being thus maintained in proximity to the spiral 58 of indicia on the dial.

Figure 2:
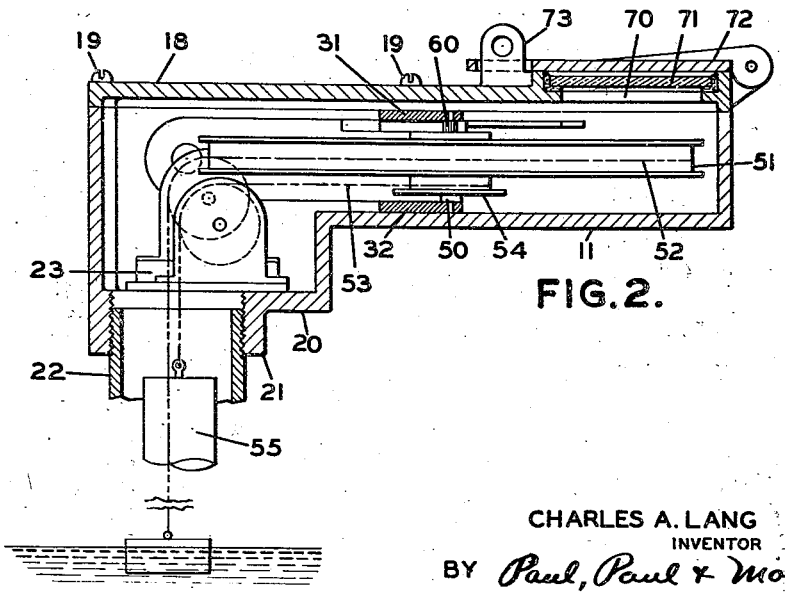
Figure 2 is an elevational view in section taken along the lines 2—2 of Figure 1.

Any suitable type of displacement member may be used in conjunction with the indicating instrument shown in Figures 1 and 2, but it is preferably of a type having a dimension sufficiently small that it may be lowered through the pipe 22 into the underground tank. It may be noted that the counter-weight 55 operates within the pipe 22, and that the wire 52 to the displacement member is arranged with reference to the counter-weight so that each moves freely within the pipe.

The operation of the gauging instrument is as follows: As the liquid level is raised, the displacement member rises allowing wire 52 to be wound upon the winding drum 51 due to the torque developed by the counter-weight 55 attached to the wire 53. The winding drum 51 has a radius which is much larger than the radius of the counterweight winding drum 54. The buoyancy of the displacement member (not illustrated), attached to wire 52, produces a relatively large torque due to the large radius of winding drum 51. The counter-torque produced by the counterweight 55 acting through cable 53 wound on drum 54 is relatively small due to the small radius of drum 54, but is sufficient to maintain a constant tension upon wire 52. The tension in wire 52 is not sufficient to lift the displacement member out of the liquid, the level of which is being measured. Consequently, the displacement member controls the rotation of winding drums 51 and 54. The length of the spiral 58 upon the drum 51 (or upon the separate disc if used) is of the same order and magnitude as the distance between low and high level positions, and the scale divisions on the spiral are accordingly of the same order and magnitude as the liquid level changes as they denote. As the liquid level is lowered, drum 51 unwinds the suspension wire 52 and pointer 67 is moved pivotally toward the shaft 50. The result is that pointer 67 is always in juxtaposition to the spiral of liquid level indicia markings corresponding to the particular liquid level existing in the tank, and the exact liquid level is indicated by the indicia on the spiral most adjacent the pointer 45.

The cover 18 is provided with an opening 70, which is preferably inclosed by means of a glass 71. Since the gauging apparatus is frequently installed in paved driveways, it is desirable to protect the glass 71 by means of a hinged metal cover 72, which is preferably provided with a hasp and lock portion 73, which enables the cover 72 to be locked closed.

In installing the apparatus, and during servicing or adjustment, the cover 18 may be removed, and the frame 30 may then be moved pivotally upon screws 40 and 42 to a position extending out of the housing. In this position however, the wire 52 extending downwardly through the pipe 22 to the displacement member, and the wire 53, which extends to the counter-weight 55 are not deranged from their pulleys 26 and 27 respectively. Hence, initial adjustment and servicing are convenient.

While it is preferred to use wires for members 52 and 53, it is obviously possible to use braided cables and the like.

This application is a division of my application, Ser. No. 204,073 filed April 25, 1938.

Many obvious variations will be apparent to those skilled in the art and such are intended to be within the purview of the invention illustrated, described and claimed.

What I claim is:

1. A gauging instrument for use in a gauging system having a displacement member and a flexible operating member attached thereto, said flexible operating member being extended or retracted by said displacement member in accordance with the condition being gauged, comprising a housing, a frame mounted in said housing for swinging movement from a position within the housing to a position extending out of the housing, a winding drum having indicia thereon pivotally mounted on said frame, a pointer in the housing cooperating with said indicia, and a pulley pivotally mounted in the housing for conducting said flexible operating member to said winding drum for attachment thereto, said system including means for causing said winding drum to rotate in a direction to wind said flexible operating member on the drum.

2. A gauging instrument for use in a gauging system having a displacement member and a flexible operating member attached thereto, said flexible operating member being extended or retracted by said displacement member in accordance with the condition being gauged, comprising a housing, a frame having opposed portions, said portions being pivotally connected to the housing along a common axis of pivoting, a drum having indicia thereon for winding said flexible operating member, said drum being pivotally mounted on the frame, and a pointer mounted on the frame for cooperation with said indicia, said system including torque means for causing rotation of the drum in a direction for winding said flexible operating member thereon.

3. A gauging instrument for use in a gauging system having a displacement member and a flexible operating member attached thereto, said flexible operating member being extended or retracted by said displacement member in accordance with the condition being gauged, comprising a flat rectangular housing, a removable cover for said housing, a frame within the housing, said frame having portions along opposed sidewalls, coaxial pivotal connections at corresponding ends of said frame portions connecting said portions to the housing for pivotally swinging the frame to a position extending from the housing, a winding drum for the flexible operating member of the gauging system, indicia disc co-pivotally mounted on the frame for movement with the winding drum, an indicia pointer on the frame, said system including torque means for causing rotation of the winding drum for winding said flexible operating member on the drum.

4. A device of the type specified in claim 3 wherein the drum has a pinion coaxially therewith and the pointer is slidably mounted for movement parallel to the indicia disc and includes a rack portion cooperating with said pinion for slidably moving the pointer from a position near the center of the indicia disc to a position near the edge of said disc as the disc rotates through a number of turns.

5. A gauging instrument for use in a gauging system having a displacement member and a flexible operating member attached thereto, said flexible operating member being extended or retracted by said displacement member in accordance with the condition being gauged, comprising a flat rectangular housing having an opening in one corner of one of the flat faces of the housing for connecting a conduit thereto, a frame in said housing having spaced arms, one lying parallel to each of two opposed sidewalls of the housing, a pivotal connection from one of said arms to the adjacent sidewall near the opening in the housing and a co-axial pivotal connection between the other arm and the housing sidewall adjacent thereto, a drum portion pivotally mounted on the frame and mounted so as to lie in the housing for winding the flexible operating member of the gauging system, an indicia disc rotatable with said drum portion, an indicia pointer mounted for cooperation with said indicia disc, and a pulley mounted in the housing for conducting said flexible operating member from the opening to the winding drum, said system including torque means for applying winding torque to the drum in a direction to wind the flexible operating member thereon.

6. A device of the type specified in claim 5 wherein the drum has a pinion rotatable coaxially therewith and the indicia pointer is mounted for slidable movement radially of the disc portion and includes a rack portion for cooperation with said pinion.

7. A device of the type set forth in claim 5 wherein the housing has a removable cover having an opening co-extensive with the radial path of movement of said indicia pointer.

8. A device of the type set forth in claim 5 wherein there is a second winding drum smaller than the first drum rotatable therewith, and a second pulley adjacent the opening in the housing for conducting a flexible member from said opening to the second winding drum.

CHARLES A. LANG.